United States Patent [19]
Price et al.

[11] Patent Number: 6,138,017
[45] Date of Patent: *Oct. 24, 2000

[54] CELLULAR COMMUNICATIONS SYSTEM

[75] Inventors: David Price, Reading, United Kingdom; Ronald James Maginley, Richardson, Tex.; Ricky Kaura, Ickenham, United Kingdom

[73] Assignee: Nortel Networks Limited, Montreal, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/986,810

[22] Filed: Dec. 8, 1997

[51] Int. Cl.$^7$ ..................................................... H04Q 7/20
[52] U.S. Cl. .......................... 455/433; 455/432; 455/445
[58] Field of Search ..................................... 455/422, 432, 455/433, 428, 435, 436, 437, 560, 408, 414, 412, 406, 554; 379/58

[56] References Cited

U.S. PATENT DOCUMENTS

| | | | |
|---|---|---|---|
| 5,548,804 | 8/1996 | Rosenlund | 455/433 |
| 5,594,942 | 1/1997 | Antic et al. | 455/433 |
| 5,623,532 | 4/1997 | Houde et al. | 455/445 |
| 5,839,072 | 11/1998 | Chien | 455/432 |
| 5,878,347 | 3/1999 | Joensuu et al. | 455/432 |
| 5,878,348 | 3/1999 | Foti | 455/432 |
| 5,884,179 | 3/1999 | Patel | 455/432 |
| 5,953,662 | 9/1999 | Linquist et al. | 455/432 |

FOREIGN PATENT DOCUMENTS

| | | |
|---|---|---|
| 0 467 534 | 1/1992 | European Pat. Off. . |
| 0 817 522 | 1/1998 | European Pat. Off. . |
| WO 97/07644 | 2/1997 | WIPO . |

Primary Examiner—Nguyen Vo
Assistant Examiner—Greta Fuller
Attorney, Agent, or Firm—Lee, Mann, Smith, McWilliams, Sweeney & Ohlson

[57] ABSTRACT

A mobile communications system incorporates a plurality of home location registers on which subscriber data is stored such that each subscriber is allocated to a selected one of the registers for voice and/or data calls. Request messages for subscriber data can be routed to any home location register which responds to that request when the data for the respective subscriber is stored on that home location register. If the data for the respective subscriber is not stored on that home location register, the message is provided with an indicator component and is rerouted to another home location register for a further processing attempt. The number of times a message is rerouted is limited to prevent perpetual circulation of messages relating to unknown subscribers.

7 Claims, 4 Drawing Sheets

Table 1  Diverting and Diverted-to HLR Processing Logic

| Subscriber Status | | Messages from Network | Re-routed Messages |
|---|---|---|---|
| Activated (A) | | Process request | Process request |
| New / Naughty (N) | Unrestricted request | Process request | Process request |
| | Restricted request | Return Unknown Subscriber error | Return Unknown Subscriber error |
| Replacement (R) | Swapover occurred | Process request | Process request |
| | No swapover | Re-route to Diverted-to HLR | Return Unknown Subscriber error |
| Deactivated[a] (D) | | Re-route to Diverted-to HLR | Return Unknown Subscriber error |
| Subscriber not in the database | | Re-route to Diverted-to HLR | Return Unknown Subscriber error | a. Deactive subscribers have their requests re-routed because the operator may have put them in this state prior to removing them from the database.

*Fig. 2*

CELLULAR COMMUNICATIONS SYSTEM

This invention relates to cellular communications systems or networks, and in particular to the storage and retrieval of subscriber information in such systems.

BACKGROUND OF THE INVENTION

A number of cellular communications systems are currently being installed to provide communications facilities to mobile terminals. In such systems, mobile terminals are served by base stations via a radio or air link, each base station defining a system cell. In order that a subscriber may be identified as an authorised system user and located so as to receive calls or other system services, the system is provided with a central database containing subscriber information which can be accessed as required. In the standardised European system commonly referred to as the GSM system, this central store is known as the home location register (HLR). The number of subscribers to mobile communications systems is rapidly increasing, and service providers are becoming concerned that their systems should have sufficient capacity to accommodate these subscribers. A particular problem is the need to store information relating to subscribers on the system home location register, as it will be appreciated that the installed storage capacity of a home location register is finite. Although systems have been designed to allow for future expansion, the unexpected growth in the number of mobile subscribers will soon exceed the storage limits of the present home location registers. One solution to this problem is the installation of a larger home location register to replace existing equipment. However, this is generally undesirable both on the grounds of cost and the possible system disruption that can occur during installation. An alternative solution is the provision of second home location register to which new subscribers are allocated when the existing register becomes full thus effectively doubling the storage capacity. It has been found however that this introduces a routing problem as each request then requires the inclusion of a code indicating the identity of the particular home location register to which the subscriber has been allocated. This requires modification of the network routing tables to accommodate this additional information and can lead to a complex routing which is difficult to manage.

Our co-pending application Ser. No 08/884309 discloses a mobile network arrangement incorporating two or more home location registers. In this arrangement, a primary home location register (HLR) is provided with one or more cascaded home location registers to which some of the subscribers are allocated. This permits sharing of the workload in processing the subscriber information requests that are involved in the setting up of calls. Routing of requests to the correct HLR is simplified by routing all such requests to the original or master HLR and forwarding only those requests for which data is stored on one of the back-up or cascaded HLRs. This avoids the need for changes in the existing system routing plan when new subscribers are added or when a subscribers details are transferred from one HLR to another.

The arrangement and method described in Ser. No 08/884309 addressed the problem of introducing a second or auxiliary home location register to an existing system to meet subscriber growth without the need for changes to existing network routing tables.

In a mobile telephone network, such as a GSM network, the routing of messages to a home location register is normally based on the subscriber number, the IMSI or the MSISDN. The IMSI, which is provided on the subscriber's SIM card, is an internal network identification of the subscriber and the MSISDN is the subscriber's diallable phone number. Ideally, there will be a co-ordination between the allocation of a subscribers MSISDN and IMSI.

In a network having more than one home location register, the subscribers will generally be partitioned logically between the registers. In order for a subscriber to gain access to the network, he must first obtain a SIM card, usually from a mobile phone retailer. However, the distribution of SIM cards to retailers and their subsequent allocation to subscribers cannot be strictly controlled, and the direct co-ordination between IMSIs and MSISDNs may be lost.

Ideally, network translations should route IMSI and MSIDN based messages to the same HLR. However, because the co-ordination of these two numbers cannot be guaranteed owing to the aforementioned difficulty of controlling the retail outlets issuing SIM cards to customers, it is possible for an IMSI based subscriber message to be routed to one HLR and a MSIDN message for the same subscriber to be rerouted from that HLR to another HLR. Further, where a subscriber's details are not stored on any system HLR, there is a risk that messages relating to that subscriber will be perpetually forwarded between HLRs.

SUMMARY OF THE INVENTION

It is an object of the present invention to provide an improved system and method for increasing the subscriber data storage capacity of a cellular communications network.

It is another object of the invention to provide an improved mobile telephone network incorporating two or more home location registers.

It is a further object of the invention to provide an improved method of messaging between home location registers in a mobile telephone system.

According to one aspect of the invention there is provided a method of routing subscriber information request messages in a cellular communications network incorporating a plurality of home location registers on which registers subscriber data is stored such that each subscriber is allocated to a selected one of said registers for voice and/or data calls, the method including routing a request message to a said home location register, processing the request message at that said home location register when the corresponding subscriber details are stored on that home location register, and diverting the message to one or more other home location register whereby to attempt processing of the request message at one of said other home location registers, and wherein the number of diversions to which a said request message is subjected is limited to a predetermined number.

According to another aspect of the invention there is provided a method of routing subscriber information request messages in a cellular communications network incorporating a plurality of home location registers on which registers subscriber data is stored such that each subscriber is allocated to a selected one of said registers for voice and/or data calls, the method including routing a said request to one said home location register, responding from that home location register to a said request message when the subscriber data relating to that request is stored on that home location register, rerouting a said request message from that home location register to a said further home location register when the subscriber data is not found on the selected one home location register, and providing an indication to said further home location register that the request message has been rerouted whereby to limit the number of diversions to which a said request message is subjected to a predetermined number.

According to another aspect of the invention there is provided a mobile communications system incorporating a plurality of home location registers on which subscriber data is stored such that each subscriber is allocated to a selected one of said registers for voice and/or data calls, means for routing request messages for subscriber data to selected one home location register, means associated with the selected one location register for responding to a said request when the data for the respective subscriber is stored on that home location register, and message rerouting means associated with each said home location register for rerouting a said subscriber data request message to another said home location register when the data for the respective subscriber is not stored on that home location register and for providing an indication to said further home location register that the request message has been rerouted whereby to limit the number of diversions to which a said request message is subjected to a predetermined number.

According to a further aspect of the invention there is provided a home location register arrangement for a mobile communications system, the arrangement comprising a plurality of home location registers on which subscriber data relating to system subscribers is stored and to which, in use, request messages for subscriber data are routed, each subscriber being allocated to a selected one of said registers for voice and/or data calls, the arrangement incorporating means associated with each said home location register for responding to a said request message when the data for the respective subscriber is stored on that home location register, and message re-routing means associated with each said home location register for forwarding a said subscriber data request message to another said further home location register when the data for the respective subscriber is not stored on the first home location register and for providing an indication to said further home location register that the request message has been rerouted whereby to limit the number of diversions to which a said request message is subjected to a predetermined number.

The technique overcomes the network routing problem by ensuring that subscriber requests routed to an incorrect HLR are rerouted to the correct HLR via a subscriber specific rerouting function.

Further, new home location registers can be introduced to an existing system on a retrofit basis to accommodate subscriber growth without the need to alter the system request routing plan. New subscribers can be allocated to a newly installed home location register, or existing subscribers can be transferred from one register to another to balance the system workload.

Selection of a home location register to which a message should initially be routed may be performed on a random or on a rota basis.

Similarly, subscribers can be allocated to a home location register e.g. on a random basis, or on a geographical basis determined from their home location. In a further embodiment, the allocation of subscribers to home location registers may be determined on the basis of user profiles so as to balance the system work load. Subscribers may also be transferred from one home location to another to facilitate work load balancing.

BRIEF DESCRIPTION OF THE DRAWINGS

Embodiments of the invention will now be described with reference to the accompanying drawings in which:

FIG. 2 illustrates a message diversion protocol employed in the system of FIG. 1;

DESCRIPTION OF PREFERRED EMBODIMENT

Figure 1:
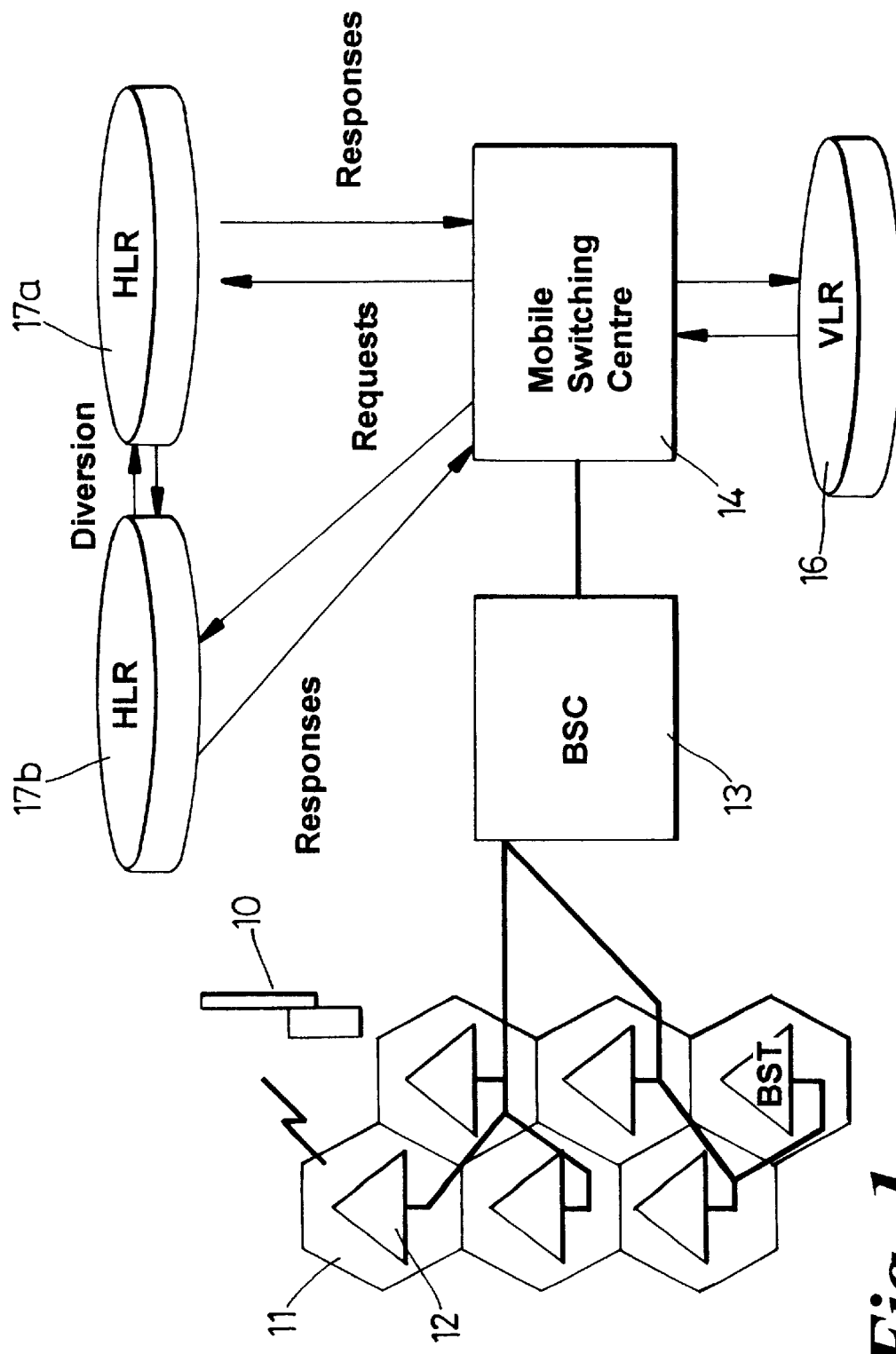
FIG. 1 is a schematic diagram of a mobile communications system incorporating a plurality of home location registers.

Referring to FIG. 1, there is depicted in highly schematic form part of a mobile cellular communications network or system. The service area of the system is subdivided into a plurality of contiguous cells 11 in each of which mobiles 10 are serviced via a respective base station 12. Operation of a group of base stations 12 is controlled via a base station controller 13 and, in turn, a number of base station controllers are serviced by a mobile switching centre (MSC) 14 which may provide an interface to the public telecommunications network (not shown). Within this arrangement, the mobile switching centre 14 may service, via the base station controllers 13 and the base stations 12, typically over one hundred individual cells 11. Information relating to the mobiles 10 that are currently located within the service area of the mobile switching centre 14 is stored in a visitors location register (VLR) or database 16 associated with the mobile switching centre. For clarity, FIG. 1 depicts only one MSC and its associated VLR, but it will be appreciated that the system will incorporate a number of MSCs each servicing is respective zone.

In the GSM, DCS-1800 and PCS-1900 schemes, a subscriber is identified using two unique identities. The International Mobile Subscriber Identity (IMSI) is used for non-call related requests to the HLR typically from the VLR, for example location updating. The IMSI is held in the subscriber identity module (SIM) of the mobile station, typically on a 'SIM card' and is not visible nor accessible to the subscriber. The Mobile Subscriber ISDN (MSISDN) is used for call related requests to the HLR typically from the MSC, for example "Send Routing Information". The MSISDN is associated with a teleservice in the HLR and is visible to caller and subscriber as the 'dialled number'. An MSC originated message will only carry an MSDISDN and will not carry an IMSI. Similarly, a VLR originated message will only carry an IMSI and not an MSISDN. Thus, requests to a HLR from the network will be based on either the IMSI or MSISDN. However the important point to note is that it is relatively easy for an operator to change a subscriber's IMSI but very disruptive to change the MSISDN. A second important point is that from the network perspective there is no intrinsic relationship between an IMSI and a MSISDN other than routing derived from them should result in a message arriving at the same HLR for the same subscriber to which they refer.

The system of FIG. 1 incorporates two or more master databases or home location registers 17a, 17b, each of which stores subscriber information and is arranged to respond to request messages from MSCs or from VLRs for subscriber information. For clarity, FIG. 1 shows only the MSC request and response communication paths, but it will be understood that similar communication paths will be provided between the visitors location register and the home location registers for carrying requests and responses therebetween.

In the arrangement of FIG. 1, each system subscriber is allocated to one of the home location registers at least in respect of voice calls. Ideally the subscriber should also be allocated to that same home location register in respect of data calls although, as discussed above, this will not always be possible.

When a mobile terminal enters the service area of the MSC 14, it registers with that MSC/VLR so that the terminal can then originate or terminate calls. As part of the registration procedure, it is necessary for information or data relating to that mobile to be retrieved by the MSC from the appropriate home location register on which that subscriber's details are stored, and these details are then stored in the visitors location register until such time as the mobile terminal leaves the service area of the MSC. In this way, the system is constantly updated with the current location of each mobile terminal so that calls to that mobile can be routed to the correct mobile switching centre for termination at the mobile.

Figure 3:
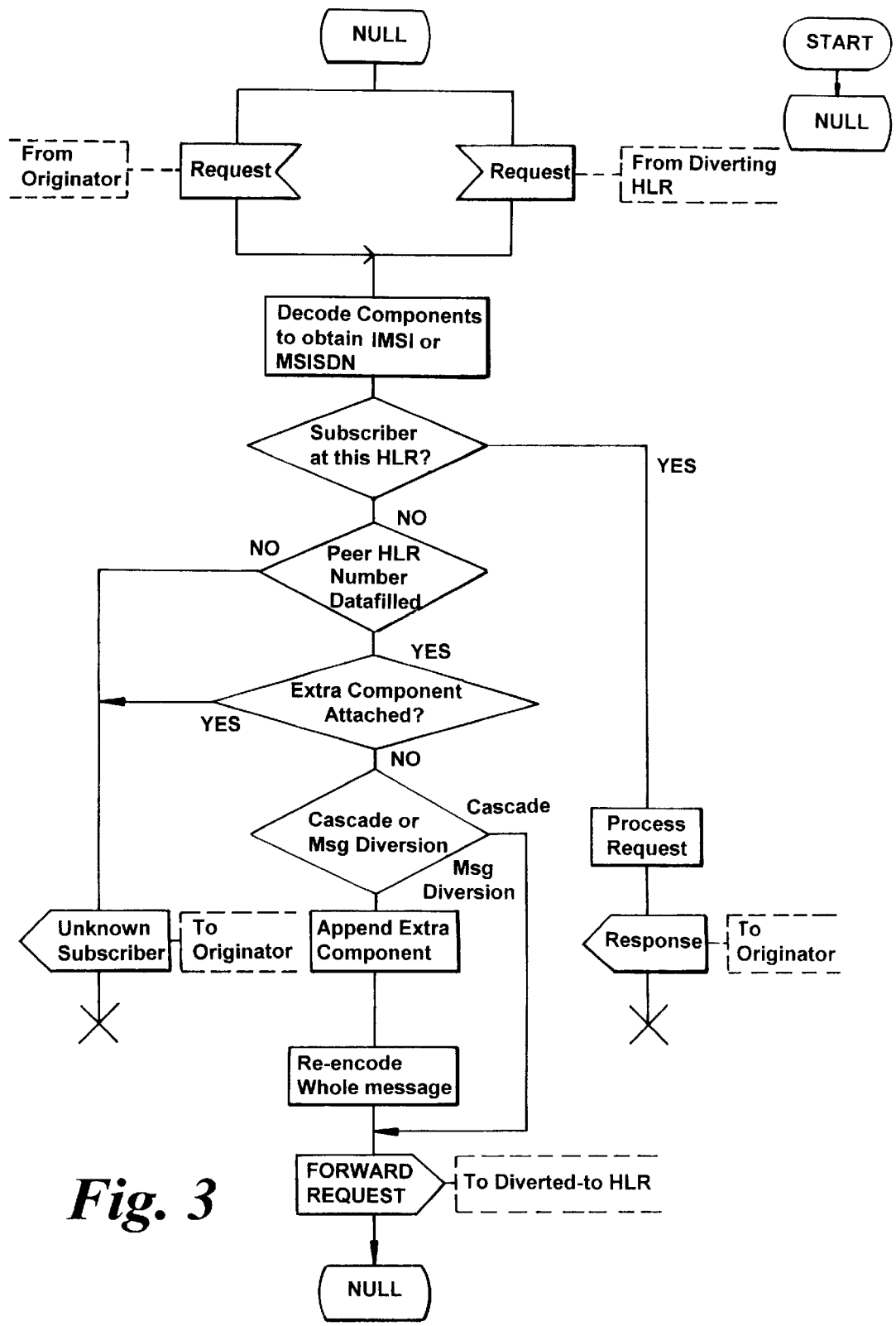
FIG. 3 is a flow chart of the message diversion process.

Referring now to FIG. 2, this illustrates a message diversion protocol for a pair of home location registers for use in the system of FIG. 1. Reference is also made to FIG. 3 which is a flow chart of the request message handling process for the system. The home location register receiving a request message is referred to as the diverting HLR (whether or not message diversion is in fact required) and the home location register receiving a diverted message from the diverting HLR is referred to as the diverted-to HLR. Note that each home location register can function both as a diverting HLR and as a diverted-to HLR.

In this system, the mobile switching centre or visitors location register sending the request message for subscriber details does not know, nor has any need to know, which of the home location registers contains that subscriber's details. Preferably the request messages sent to a home location register and the responses to those messages are encoded to prevent "eavesdropping" which could reveal the subscriber's IMSI or MSISDN and thus facilitate unauthorised cloning of a subscriber terminal.

Each request message incorporates an addressing portion and a user data portion, the former being referred to as a signalling connection control part (SCCP) and the latter a transaction capability application part (TCAP). The SCCP message incorporates the called party address (CdPA) and the calling party address (CgPA). The TCAP message comprises a transaction portion incorporating the subscriber information request, an optional dialogue portion and a component portion.

A request message can be sent to any one of the home location registers, i.e. that home location register can be the diverting HLR for that particular message. Selection of the home location register to which the request message is sent can be determined on a rota basis, on a random basis, or the home location register with the shortest message queue can be selected. In a further embodiment, those subscribers with the highest volume of call traffic and/or a high degree of mobility can be identified and appropriately allocated to selected home location registers so as to spread or balance the system work load. This ensures that no one HLR is so unduly overloaded that it cannot readily identify and divert those requests for which subscriber information resides on another HLR.

At the diverting HLR, the received request message is processed up to the point where the subscriber's identity (IMSI or MSISDN) is identified and verified. This is done by decoding the message to recover the IMSI or MSISDN. If the subscriber's details are found, and it is confirmed that the subscriber is entitled to have access to the network, and if the relevant subscriber details then are found on the diverting HLR, the request is processed and the appropriate details are returned to the originator of the request message. If an improper or unauthorised subscriber identity is determined, an error message is returned to the sender so that access to the network can be denied. Further processing of that request is then terminated.

If however the subscriber's identity is confirmed but the corresponding details are not found on that home location register, an indicator component is added to the message which is then reencoded and rerouted to the diverted-to HLR. At the diverted-to HLR, the message is again decoded to recover the IMSI or MSISDN and a search is made for the subscriber details. If the relevant subscriber details are found on the diverted-to HLR, the request is processed and the appropriate details are returned to the originator of the request message. If the subscriber details cannot be found and the added indicator component is determined to be present in the decoded message, an error or unknown subscriber message is returned to the message originator. The use of this indicator component of a message to identify a diverted message prevents a message relating to an unknown subscriber from being bounced back and forth between the home location registers.

The use of the indicator component technique described above can be extended to a system having more than two home location registers. In such a system, the indicator component is used either to identify the number of times a message has been diverted or to list the identities of those home location registers that have previously diverted the message. When the number of diversions is one less than the number of home location registers and the subscriber details cannot be found, an unknown subscriber error message is generated and no further diversions are permitted.

Figure 4:
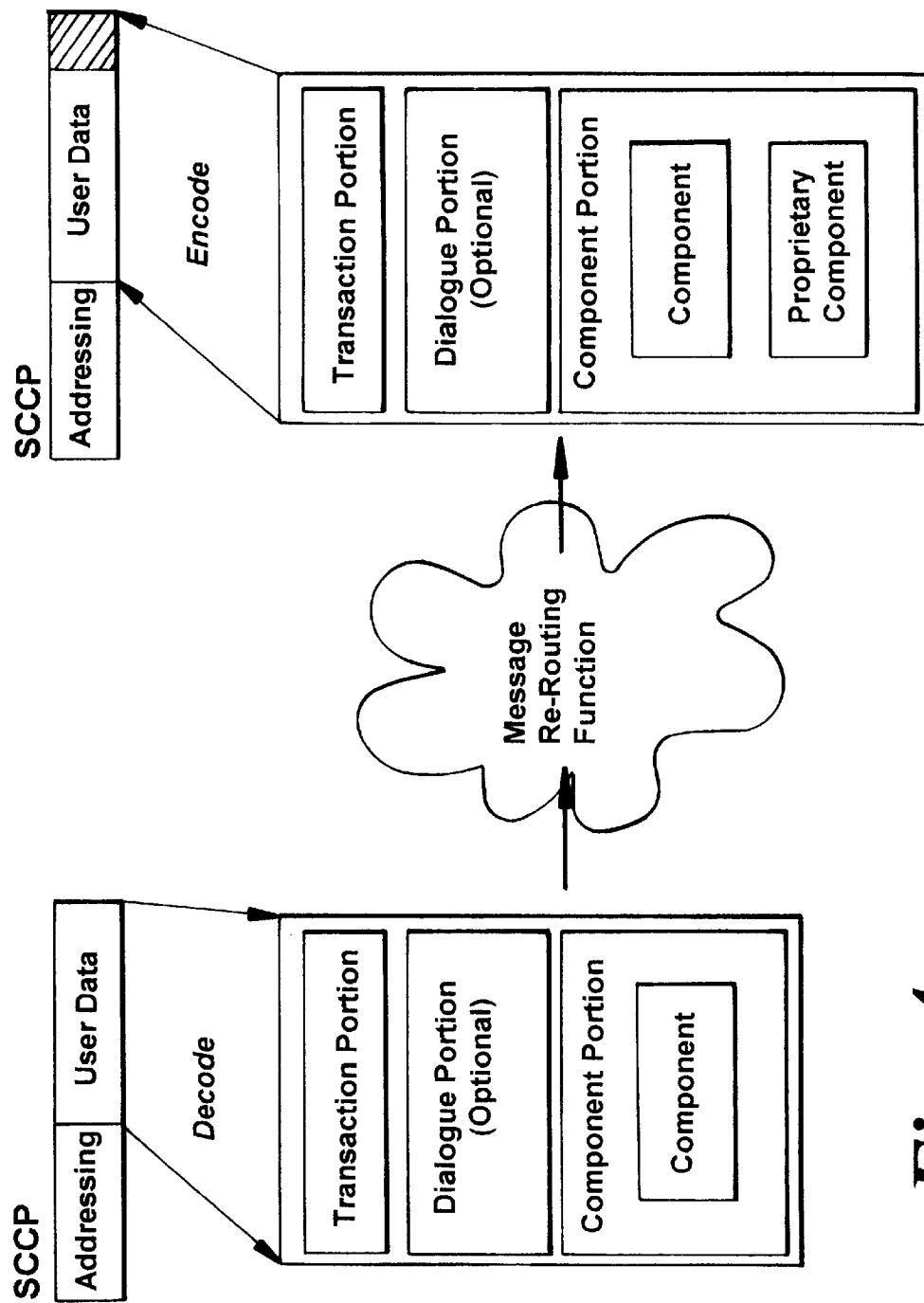
FIG. 4 illustrates a message rerouting function for use in the system of FIG. 1.

The message rerouting function employed in the system of FIG. 1 is illustrated in FIG. 4. When a diverting HLR decides to reroute a message, it calls up the message rerouting function. This function reconstructs the original TCAP message by decoding the user data portion, and appends another component to its component portion. It is the presence of this further component in the message that will provide an indication to the diverted-to HLR that the message has been diverted from the diverting HLR. The diverted-to HLR number is placed in the called party address (CdPA) in the SCCP portion of the message. The calling party address (CgPA) of the message is preserved so that any subsequent response from a diverted-to HLR can be returned to the original requester.

If the diverted request message reaches the diverted-to HLR and there is a problem in processing the message, e.g. the subscriber is not registered with the diverted-to HLR, an error message indicative of the problem is returned to the original requester whose calling party address has been preserved in the message.

The above description of the construction and use of systems incorporating a plurality of home location registers makes particular reference to use in a land based mobile communications system. However, it will be understood that use of the technique is in no way limited to land based systems and that it is equally applicable to mobile communication systems incorporating geostationary or non-geostationary satellite nodes.

We claim:

1. A method of routing subscriber information request messages in a cellular communications network incorporating a plurality of home location registers each serving a common service region and on which registers subscriber data for subscribers each having a unique identity and allocated to that common service region is stored such that each subscriber is allocated only to a selected one of said registers, the method including routing for a subscriber a request message incorporating the subscriber identity to one of said home location registers irrespective of whether or not the subscriber details corresponding to that subscriber are stored on that one home location register, at said one home location register, processing the request message to a stage at which the subscriber identity contained in the message is verified, determining whether the subscriber details are stored on said one home location register, completing processing of the request message at that said home location register if the corresponding subscriber details are determined to be stored on said one home location register, and, when the subscriber details are not stored on said one home location register, adding an indicator component to the request message and diverting the request message to one or more other home location registers whereby to attempt processing of the request message at one of said other home location registers, and wherein the number of diversions to which said request message is subjected is limited to a predetermined number determined by said indicator.

2. A method as claimed in claim 1, wherein each said request message comprises an addressing portion indicative of the message origin and destination and a data portion.

3. A method as claimed in claim 2, wherein the data portion of each said message comprises a component portion and a transaction portion, the transaction portion containing the request for subscriber information.

4. A method as claimed in claim 3, wherein said indication that a message has been diverted by a home location register comprises an indicator component inserted in the component portion of the message by that home location register.

5. A method as claimed in claim 3, wherein the data portion of each said message incorporates a dialogue portion.

6. A mobile communications system incorporating a plurality of home location registers each serving a common service region and on which registers subscriber data for subscribers each having a unique identity and allocated to that common service region is stored such that each subscriber is allocated only to a selected one of said registers for voice and/or data calls, the system comprising; means for routing for a subscriber a request message incorporating the subscriber identity to one of home location registers irrespective of whether or not the subscriber details corresponding to that subscriber are stored on that one home location register, means associated with the selected one home location register for processing the request message to a stage at which the subscriber identity contained in the message is verified, means for determining whether the subscriber details are stored on that one home location register and for completing processing of said request message when the data for the respective subscriber is determined to be stored on that one home location register, and message diverting means associated with each said home location register for diverting said subscriber data request message to another said home location register when the data for the respective subscriber is not stored on that one home location register and for providing an indication to said further home location register that the request message has been diverted whereby to limit the number of diversions to which said request message is subjected to a predetermined number determined by said indicator.

7. A home location register arrangement for a mobile communications system, the arrangement comprising a plurality of home location registers each serving a common service region and on which registers subscriber data for subscribers each having a unique identity and allocated to that common service region is stored, each subscriber being allocated only to a selected one of said home location registers for voice and/or data calls, and to each of which registers, in use, request messages incorporating subscriber identities are routed irrespective of whether or not the subscriber details corresponding to a subscriber are stored on that home location register, the arrangement incorporating means associated with each said home location register for processing the request message to a stage at which the subscriber identity contained in the message is verified, means for determining whether the subscriber details are stored on that one home location register and for completing processing of a said request message when the data for the respective subscriber is stored on that home location register, and message diverting means associated with each said home location register for diverting a subscriber data request message to a further one of said home location registers when the data for the respective subscriber is not stored on the first home location register and for providing an indication to said further home location register that the request message has been diverted whereby to limit the number of diversions to which a request message is subjected to a predetermined number determined by said indicator.

\* \* \* \* \*